(12) United States Patent
Pantzar

(10) Patent No.: US 7,131,802 B2
(45) Date of Patent: Nov. 7, 2006

(54) MALE/FEMALE TOOL COUPLING FOR ROTARY TOOLS

(75) Inventor: Göran Pantzar, Årsunda (SE)

(73) Assignee: Sandvik Intellectual Property AB, Sandviken (SE)

( * ) Notice: Subject to any disclaimer, the term of this patent is extended or adjusted under 35 U.S.C. 154(b) by 154 days.

(21) Appl. No.: 10/765,117

(22) Filed: Jan. 28, 2004

(65) Prior Publication Data

US 2004/0213642 A1 Oct. 28, 2004

(30) Foreign Application Priority Data

Jan. 28, 2003 (SE) .................... 0300197

(51) Int. Cl.
B23B 51/00 (2006.01)
B23C 6/26 (2006.01)
(52) U.S. Cl. .................. 409/234; 409/232; 409/239 R; 279/8
(58) Field of Classification Search ................ 409/234, 409/232, 233; 464/151, 147, 146, 143, 104; 407/34, 40; 192/108; 411/417, 418; 279/8; 408/231, 233, 238, 239 R, 713
See application file for complete search history.

(56) References Cited

U.S. PATENT DOCUMENTS

| | | | |
|---|---|---|---|
| 4,621,960 A | 11/1986 | Töllner | |
| 4,655,655 A * | 4/1987 | Schurfeld | 409/232 |
| 4,834,597 A * | 5/1989 | Andersson et al. | 409/234 |
| 4,934,883 A * | 6/1990 | Andersson et al. | 409/234 |
| 5,026,224 A * | 6/1991 | Andersson et al. | 409/234 |
| 5,114,286 A | 5/1992 | Calkins | |
| 5,551,811 A * | 9/1996 | Satran et al. | 407/40 |
| 5,607,263 A | 3/1997 | Nespeta et al. | |
| 5,904,455 A * | 5/1999 | Krenzer et al. | 408/144 |
| 6,059,492 A * | 5/2000 | Hecht | 408/144 |
| 6,276,879 B1 | 8/2001 | Hecht | |
| 6,540,449 B1 | 4/2003 | Bejerstal et al. | |
| 6,695,551 B1 * | 2/2004 | Silver | 408/144 |

FOREIGN PATENT DOCUMENTS

| | | |
|---|---|---|
| EP | 1310313 A1 | 5/2003 |
| WO | 02-34441 A1 | 5/2002 |
| WO | 03/064086 A1 | 8/2003 |

* cited by examiner

Primary Examiner—Monica Carter
Assistant Examiner—Dana Ross
(74) Attorney, Agent, or Firm—Drinker Biddle & Reath LLP

(57) ABSTRACT

A rotary tool includes first and second tool bodies defining an axis and clamped together in the axial direction by a screw. The tool bodies include axially extending male and female parts that engage one another to transmit rotary force. Spaced radially outwardly of the male and female parts are two sets of radial guiding structures for guiding the tool bodies in the radial direction, so a radial play can exist between the male and female parts.

13 Claims, 3 Drawing Sheets

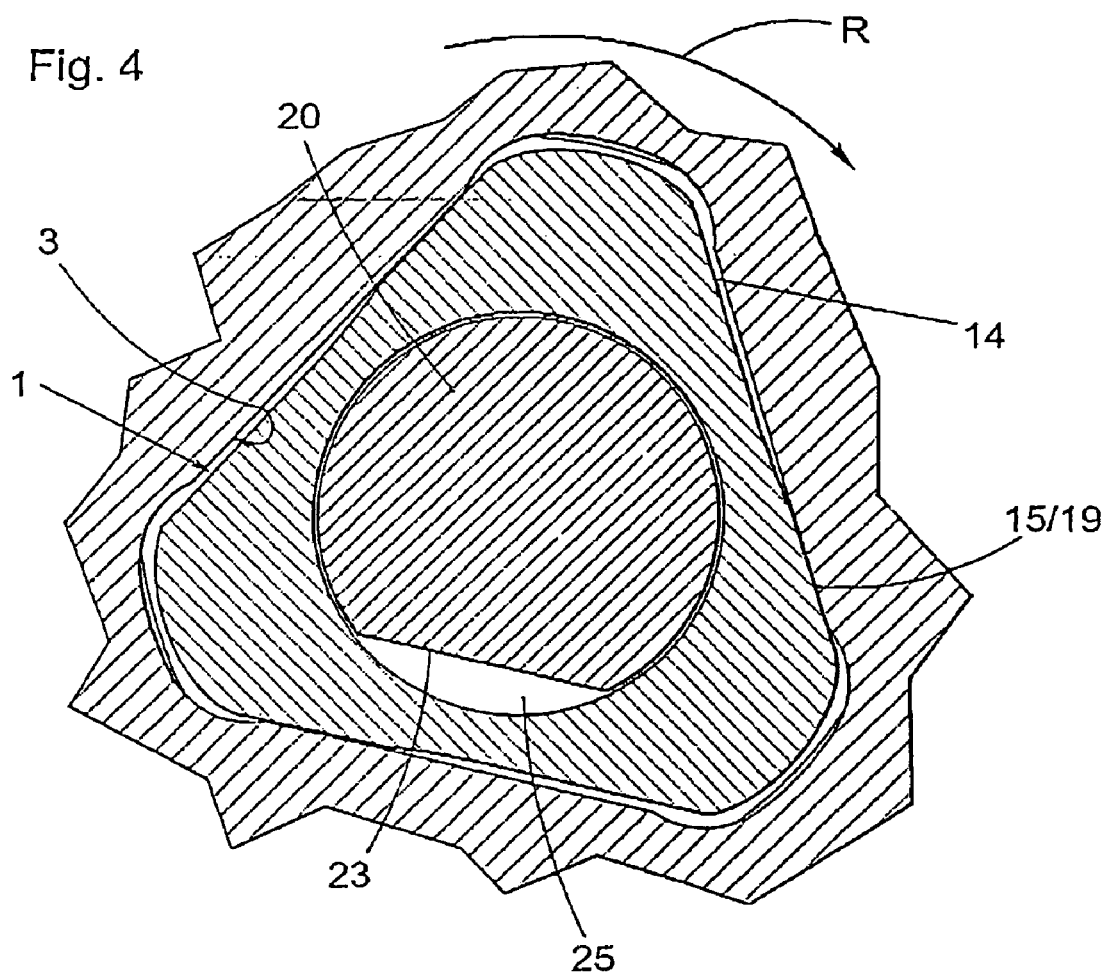

US 7,131,802 B2

MALE/FEMALE TOOL COUPLING FOR ROTARY TOOLS

This application claims priority from Patent Application Serial No. 0300197-1 filed in Sweden on Jan. 28, 2003, the entire content of which is hereby incorporated by reference.

TECHNICAL FIELD OF THE INVENTION

The present invention relates to a tool coupling for rotary tools for chip removing machining, which tool coupling is intended to interconnect a first tool body and a second tool body. The tool coupling comprises a male part arranged on the first tool body and a female part arranged on the second tool body, the male part and the female part being intended to be in engagement with each other in an operative state of the tool coupling. The tool coupling comprises members for applying an axial, uniting force to the male part and the female part.

PRIOR ART

From Swedish Patent 457,623 (corresponding to Andersson et al. U.S. Pat. No. 4,834,597), a tool coupling is previously known where a male part interacts with a female part, the same being conical and having non-circular cross-sections. In the operative state of the tool coupling, the male part is received in the female part and at final displacement of the male part in relation to the female part, an elastic deformation of the female part takes place in the area of the open end thereof. No additional guiding in the radial direction of the tool coupling, apart from the mutual guiding between the male part and the female part, exists in the tool coupling according to SE-B 457 623.

From U.S. Pat. No. 4,621,960, a tool coupling is previously known that comprises a male part and a female part, which are conical having a circular cross-section. Furthermore, the tool coupling comprises driver members in the form of buttons, which interact with recesses. An axially extending screw brings about engagement between the male part and the female part, contact being also established between stop faces included in the tool coupling, which are located at a radial distance from the male part/female part. These stop faces do not provide any guiding in the radial direction of the tool coupling.

OBJECTS AND FEATURES OF THE INVENTION

A primary object of the present invention is to provide a tool coupling of the kind defined by way of introduction, which coupling is free of play.

An additional object of the present invention is that the coupling should ensure a high precision, especially in the radial direction, as for the chip removing machining carried out by cutting inserts disposed on the tool head.

Yet another object of the invention of the present invention is that the tool coupling according to the present invention should be user-friendly and automatically adjust the tool bodies which are connected in mutually correct positions.

At least the primary object of the present invention is realized by means of a rotary tool comprising first and second tool holders together defining a center axis and being clamped together in an axial direction by a force-applying member. The first tool body includes an axially extending male part and the second tool body includes an axially extending female part in which the male part is received. First and second guiding structures are provided for guiding the first and second tool bodies relative to one another in the radial direction. The first guiding structure includes radially outer interengaging guide surfaces disposed on the first and second tool bodies at a location adjacent outer circumferences thereof. The second guide structure includes radially inner interengaging guide surfaces connected to the male and female parts, respectively.

BRIEF DESCRIPTION OF THE DRAWING

Below, an embodiment of the invention will be described, reference being made to the appended drawings, where:

FIG. 4 shows a section, along IV—IV in FIG. 3, through the male part and the female part when these are in engagement with each other.

DETAILED DESCRIPTION OF A PREFERRED EMBODIMENT OF THE INVENTION

Figure 1:
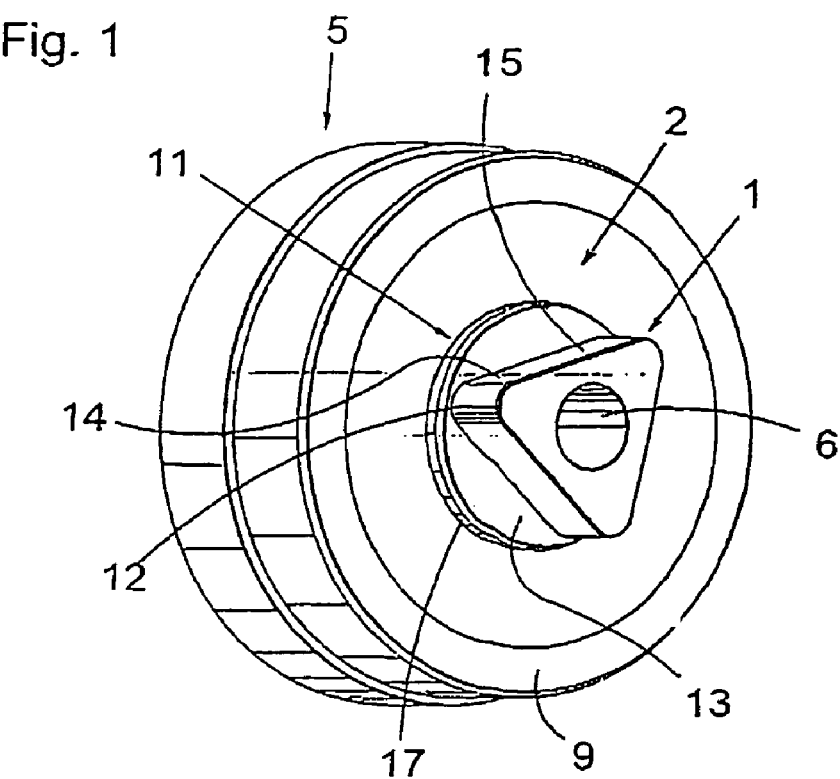
FIG. 1 shows a perspective view of a first tool body, which is provided with a male part included in the tool coupling according to the present invention.
Figure 2:
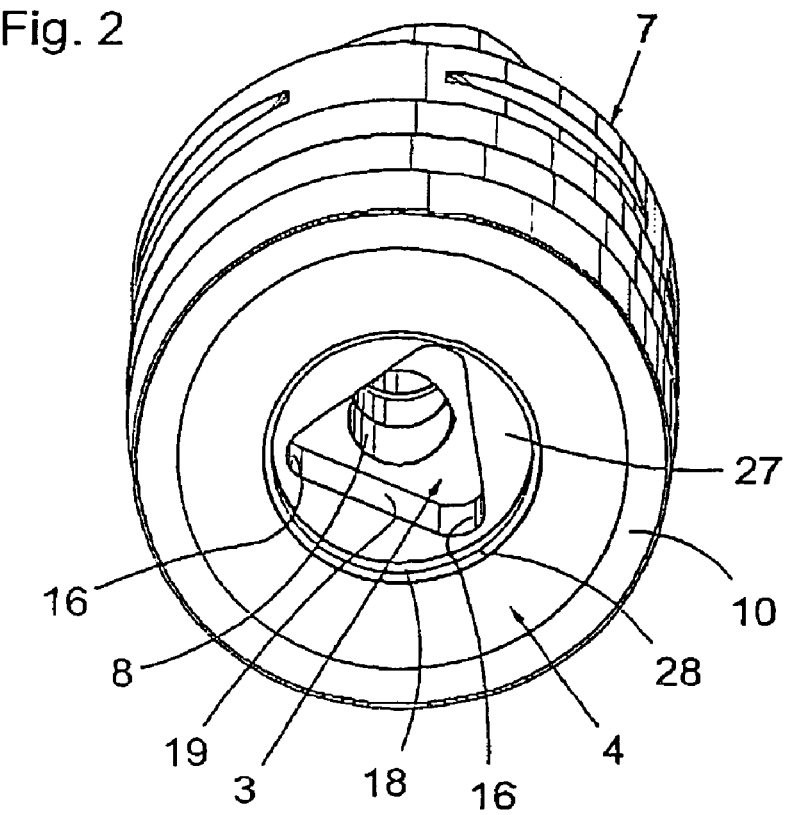
FIG. 2 shows a perspective view of a second tool body, which is provided with a female part included in the tool coupling according to the present invention.

The embodiment of a tool coupling according to the present invention illustrated in FIGS. 1 and 2 comprises a male part 1, see FIG. 1, and a female part 3, see FIG. 2. The male part 1 is arranged on a first contact or end surface 2 of a first tool body 5 and the female part 3 is formed in a second contact or end surface 4 of a second tool body 7. The first tool body 5 may, for instance, consist of a cutter head while the second tool body 7, for instance, may consist of an extender or the like. At the end facing away from the female part 3, the second tool body 7 may be provided with some other type of tool coupling, for instance the tool coupling CAPTO®, marketed by AB Sandvik Coromant. The tool bodies 5 and 7 are only shown schematically in the present patent application.

In the illustrated embodiment, an axial first center hole 6 extends through a part of the first tool body 5 and an axial second center hole 8 extends through the second tool body 7. The first center hole 6 is internally threaded while the second center hole 8 is provided with a step 8A, the function of which will be described below in connection with the connection of the tool bodies 5 and 7, shown in FIG. 3.

Furthermore, the tool coupling according to the present invention comprises a first guiding, which in the embodiment according to FIGS. 1 and 2 comprises a circular ridge 9, which is arranged on the first contact surface 2 at a certain radial distance from the male part 1, in connection with the circumference of the first tool body 5. The guiding furthermore comprises a circular groove 10, which is arranged in the second contact surface 4 at a certain radial distance from the female part 3, in connection with the circumference of the second tool body 7. How the circular ridge 9 interacts with the circular groove 10 will be seen in the description below.

The male part 1 illustrated in FIG. 1 is generally triangular having rounded first corner portions 12, which are convex/rounded in the direction of the circumference of the male part 1. Between the first corner portions 12, the male part 1 presents two part side surfaces 14 and 15, the first part side surface 14 of which is planar while the second part side surface 15 is convex in the direction of the circumference of the male part 1 (see FIG. 4).

The male part 1 also comprises a second guiding 11, which generally forms a transition between the male part 1 and the first contact surface 2. The second guiding 11 comprises a planar front surface 13, which generally has an extension parallel with the first contact surface 2, as well as a circular cylindrical external guide surface 17, which extends between the first contact surface 2 and the front surface 13. Generally, the second guiding 11 forms a member protruding from the second contact surface 2.

The female part 3, see FIG. 2, also has a generally triangular shape having rounded second corner portions 16. Between adjacent ones of the second corner portions 16, a side surface 19 extends, which is preferably planar. The female part 3 also presents an internal guide surface 18, which has a circular cylindrical shape and extends between the second contact surface 4 and a transition surface 27, which generally extends parallel with the second contact surface 4. Between the second contact surface 4 and the guide surface 18, a chamfer 28 is arranged.

The ridge and groove 9, 10 define radially outer interengaging guide surfaces, whereas the surfaces 17, 18 define radially inner interengaging guide surfaces.

The male part 1 illustrated in FIG. 1 fits into the female part 3 illustrated in FIG. 2 by the fact that there is a small gap between the male part 1 and the female part 3. This means that the male part 1 does not actively guide in the radial direction when it is received in the female part 3, but that the radial guiding takes place on one hand by the fact that the second guiding 11 interacts with the guide surface 18, and on the other hand by the fact that the circular ridge interacts with the circular groove 10 in a way which will be described more in detail below.

Figure 3:
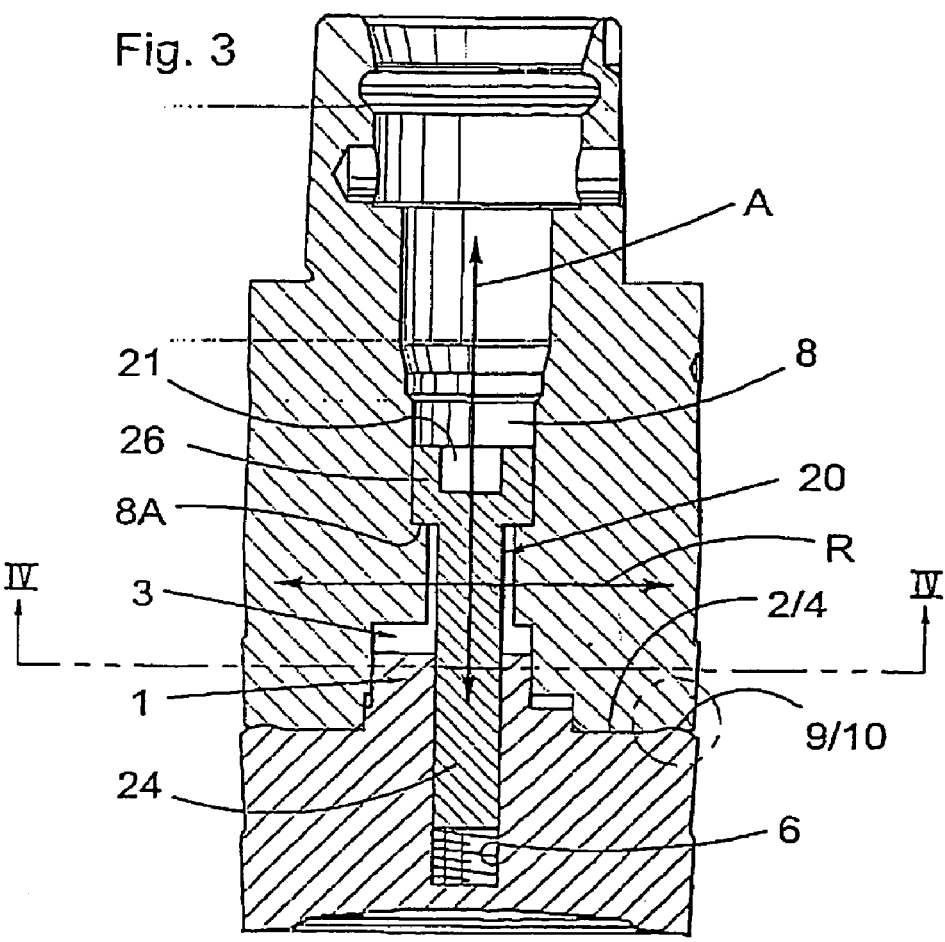
FIG. 3 shows a longitudinal cross-section through a schematically illustrated tool, which is provided with a tool coupling according to the present invention.
Figure 3A:
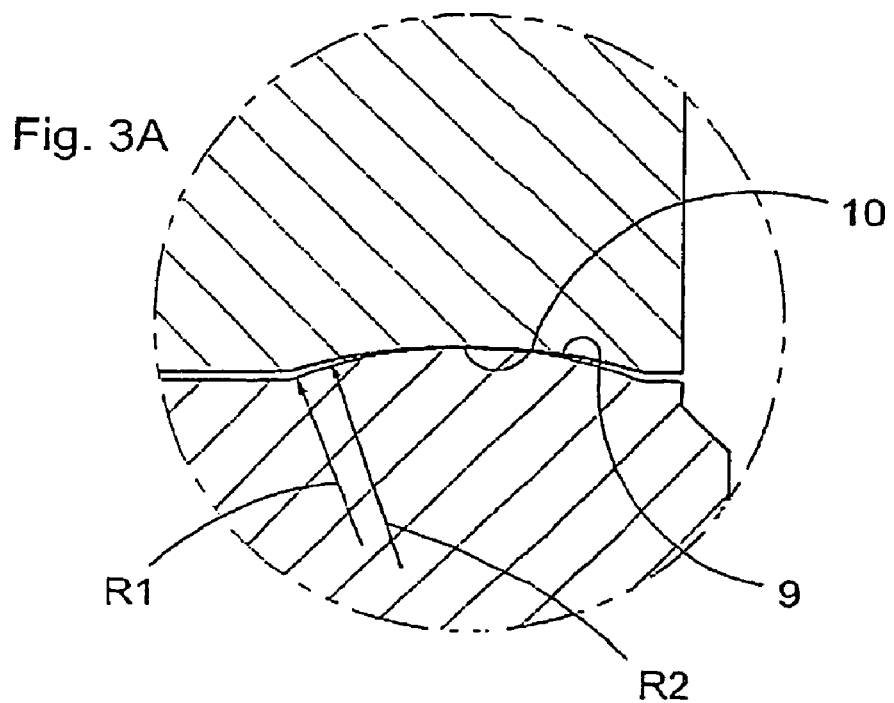
FIG. 3A shows a detail encircled in FIG. 3.

In FIG. 3, the two tool bodies 5 and 7 are shown in a connected state, i.e. the male part 1 is received in the female part 3, the contact surfaces 2 and 4 abutting against each other and the circular ridge 9 being received in the circular groove 10, see especially FIG. 3A where the ridge 9 and the groove 10 are shown in detail. A double arrow A symbolizes the axial direction of the tool while a double arrow R symbolizes the radial direction of the tool. A head 26 of an axially extending, externally threaded locking screw 20 abuts against the step 8A and extends through the second hole 8, through the female part 3 and past the second contact surface 4. The externally threaded shank 24 of the screw 20 has its free end received in the first hole 6. The head 26 of the locking screw 20 is in the usual way provided with an internal key recess 21 in order to enable rotation of the locking screw 20, and thereby connection of the tool bodies 5 and 7 in a satisfactory way.

At connection of the two tool bodies 5 and 7, the male part 1 is thus inserted into the female part 3, the first corner portions 12 of the male part 1 being guided by the second corner portions 16 of the female part 3 during the initial stage. The displacement of the male part 1 into the female part 3 is effected by rotation of the locking screw 20, the externally threaded portion thereof being in engagement with the internally threaded first hole 6. When the male part 1 has bottomed in the female part 3, the part side surfaces 14 and 15 of the male part 2 are exactly opposite the side surface 19 of the female part 3. At this stage, also the ridge 9 of the first tool body 5 has been received in the groove 10 of the second tool body 7, i.e. contact has been established between the ridge 9 and the groove 10. In this connection, it should also be mentioned that the contact surfaces 2 and 4 are not in contact with each other, in order to guarantee that contact is established between the ridge 9 and the groove 10.

The guiding 11 has been brought into engagement with the guide surface 16. The introduction of the guiding 11 into engagement with the guide surface 18 is facilitated by the chamfer 28.

By interaction, on one hand, between the guiding 11 and the guide surface 18, and on the other hand between the ridge 9 and the groove 20, a mutual guiding in the radial direction of the two tool bodies 5 and 7 will be effected. By virtue of the gap between the male part 1 and the female part 3, which is provided by a certain play between the part side surfaces 14, 15 and the side surface 19, see FIG. 4, the guiding that is effected by the interaction of the guiding 11 and the guide surface 18 and the interaction of the ridge 9 and the groove 10 will be prevail over the guiding that is achieved by the corner portions 12 and 16 and the part side surfaces 14, 15, and the side surface 19, respectively. In the cross-section illustrated in FIG. 3A, the ridge 9 preferably has a somewhat smaller radius of curvature R1 than the radius of curvature R2 of the groove 10. This entails that the requirements for practical manufacturing precision for the ridge 9 and the groove 10 are somewhat reduced.

In this connection, it should be pointed out that when a lateral force is applied to the first tool body 5, a mutual lateral displacement of the tool bodies 5, 7 will to an exceptionally large extent be counteracted by the interaction between the ridge 9 and the groove 10 by the fact that these are axially kept together by the locking screw 20.

When a rotation is applied to the second tool body 7, also the female part 3 will obviously rotate, the male part 2 and the first tool body 5 being driven. In this connection, reference is made to FIG. 4. which shows a section through the male part 1 and the female part 3 in an operative state of these parts. As may be seen in FIG. 4, where the direction of rotation is marked by R, the side surface 19 will contact the convex part side surface 15 during rotation of the female part 3, the rotation force being transferred by these three contact areas 15/19.

In FIG. 4, it is also seen most clearly that the locking screw 20 is provided with a longitudinal chamfering 23, which preferably extends along the entire shank 24 of the locking screw 20. Said chamfering 23 provides a space 25 between the shank of the locking screw and the holes 6 and 8, wherein cooling medium may be supplied in said space. How the cooling medium is further distributed in the area of the head 26 of the locking screw 20 is not indicated in FIG. 3. In this connection, it should be pointed out that the design of the locking screw 20, i.e. the arrangement of a longitudinal chamfering 23, may have a general application for tools for chip removing machining where it is important to provide a space for the supply of cooling medium.

When the first tool body 5 is to be disassembled from the second tool body 7, the locking screw 20 is rotated in the opposite direction compared to when the tool bodies 5, 7 are connected.

In the above-described embodiment of the present invention, the tool bodies 5 and 7 are shown schematically in the form of generally cylindrical members. However, the fact is that in reality these tool bodies 5 arid 7 are machined depending on the type of tools that they are included in. Thereby, the periphery of these tool bodies 5 and 7 will normally be interrupted at a number of places, which in turn involves that the circular ridge 9 and the circular groove 10 of the completed tool will not be continuous, but interrupted at a number of places, i.e., they will be "arch-shaped".

FEASIBLE MODIFICATIONS OF THE INVENTION

In the above-described embodiments, the male part 1 is arranged on the first tool body 5, i.e. the part which, for instance, may constitute a cutter head. Within the scope off the present invention, however, it is also feasible that the female part 3 is formed in the first tool body 5, the male part 1 in that case being arranged on the second tool body, which, for instance, may constitute an extender.

In the above-described embodiment, the ridge 9 and the groove 10 are circular, wherein they may be interrupted at a number of places, for reasons given above. However, the ridges/grooves do not need to be arc-shaped, but they may have another curved shape or even be straight.

Although the present invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A rotary tool comprising first and second tool bodies together defining a center axis and being clamped together in an axial direction by a force-applying member, wherein the first tool body including an axially extending male part, and the second tool body including an axially extending female part in which the male part is received; and first and second guiding structures for guiding the first and second tool bodies relative to one another in the radial direction; the first guiding structure including radially outer interengaging guide surfaces disposed on the first and second tool bodies at a location adjacent outer circumferences thereof; the second guide structure including radially inner interengaging guide surfaces connected to the male and female parts, respectively, wherein the first and second tool bodies include first and second end surfaces, respectively, facing each other and disposed in non-contacting relationship when said first and second tool bodies are connected, and wherein the radially outer interengaging guide surfaces comprise a generally axially extending ridge on one of the first and second tool bodies, and a groove disposed in the other of the first and second tool bodies and in which the ridge is disposed.

2. The tool according to claim 1 wherein the ridge and the groove are complementarily arch-shaped.

3. The tool according to claim 2 wherein the ridge is disposed on one of the end surfaces, and the groove is disposed in the other end surface.

4. The tool according to claim 1 wherein the ridge is curved and has a first radius of curvature, and the groove is curved and has a second radius of curvature larger than the first radius of curvature.

5. The tool according to claim 1 wherein the radially inner interengaging surfaces are of complementary shape.

6. The tool according to claim 1 wherein the radially inner interengaging surfaces comprise a cylindrical projection and a cylindrical recess receiving the projection, the projection and the recess defining a center axis coinciding with the center axis of the tool.

7. The tool according to claim 1 wherein the radially inner interengaging surfaces comprise a cylindrical projection and a cylindrical recess receiving the projection, the projection and the recess defining a center axis coinciding with the center axis of the tool.

8. The tool according to claim 1 wherein the male and female parts have a generally triangular cross section.

9. The tool according to claim 8 wherein the male part has three side surfaces, each comprising a portion of convex shape as viewed in the direction of the axis.

10. The tool according to claim 1 wherein the male and female parts are configured to provide radial play between one another.

11. The tool according to clam 1 wherein the force-applying member comprises a screw extending along the axis.

12. The tool according to claim 11 wherein the screw includes a shank having a longitudinal chamfer extending along an entire length thereof.

13. The tool according to claim 1 wherein one of the first and second tool bodies constitutes a tool head.

* * * * *